Feb. 17, 1948.  G. M. SHIPP  2,436,079
SYSTEM AND APPARATUS FOR FUEL IGNITION
Filed Aug. 30, 1944  3 Sheets-Sheet 1
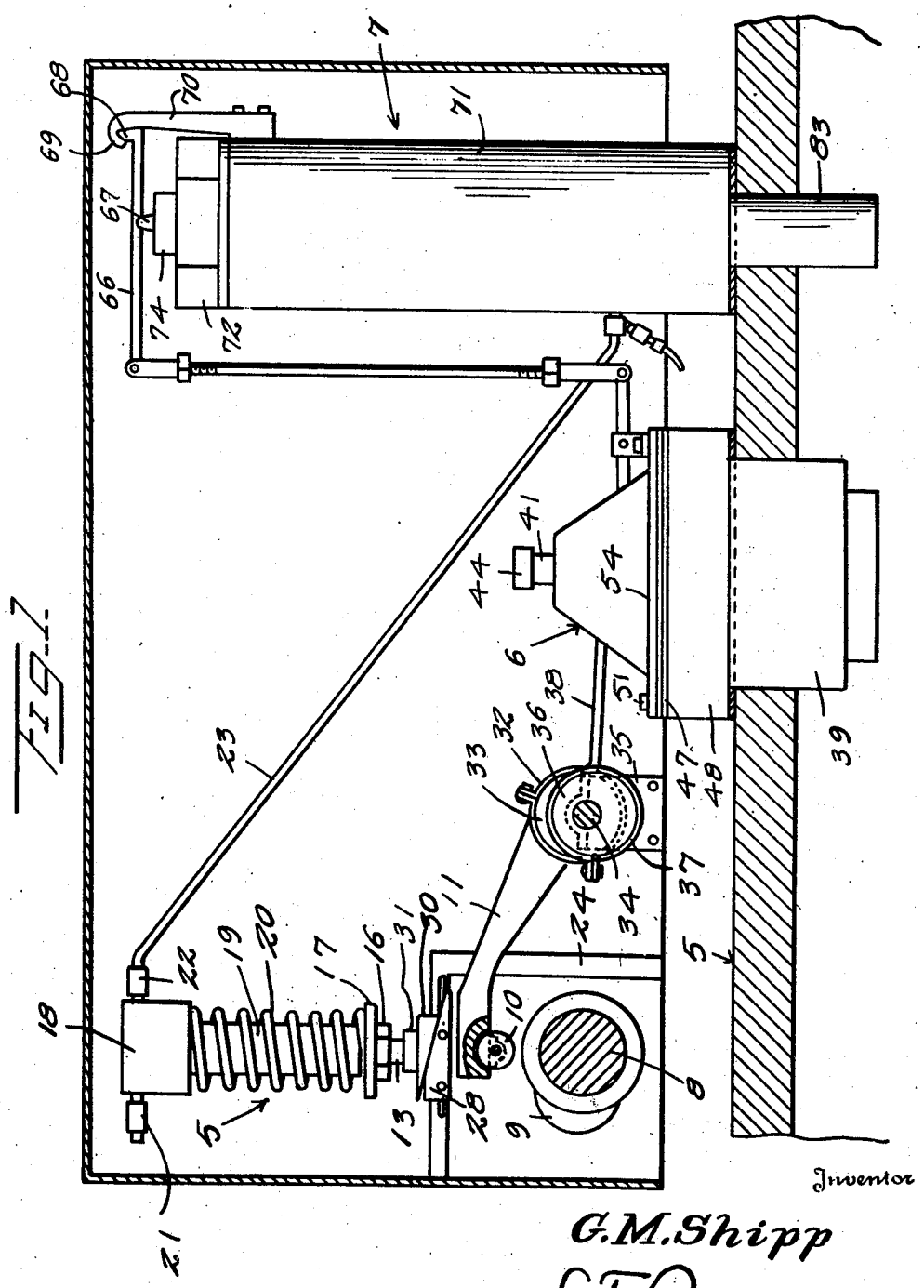
Inventor
G. M. Shipp
By L. F. Randolph
Attorney

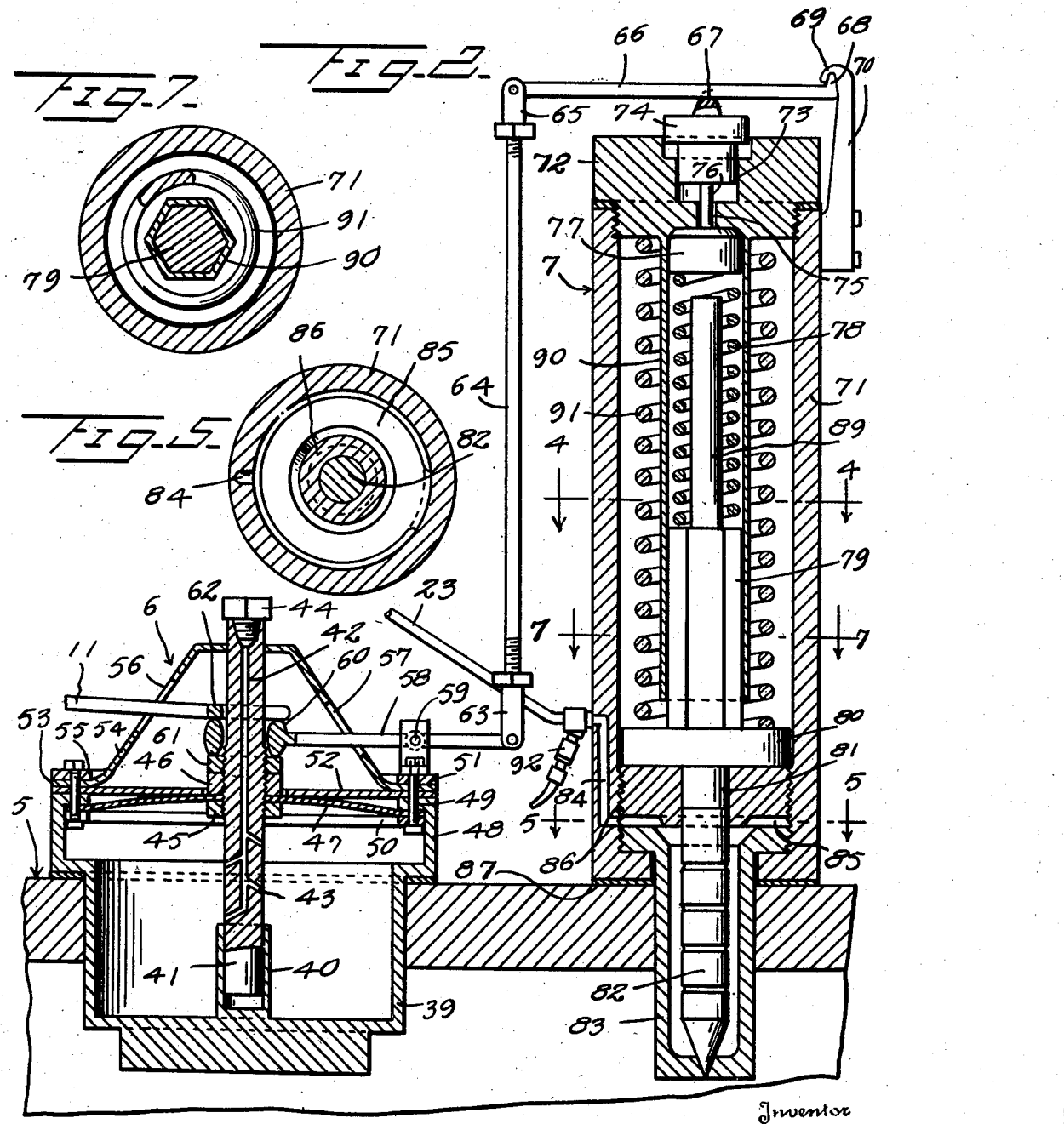

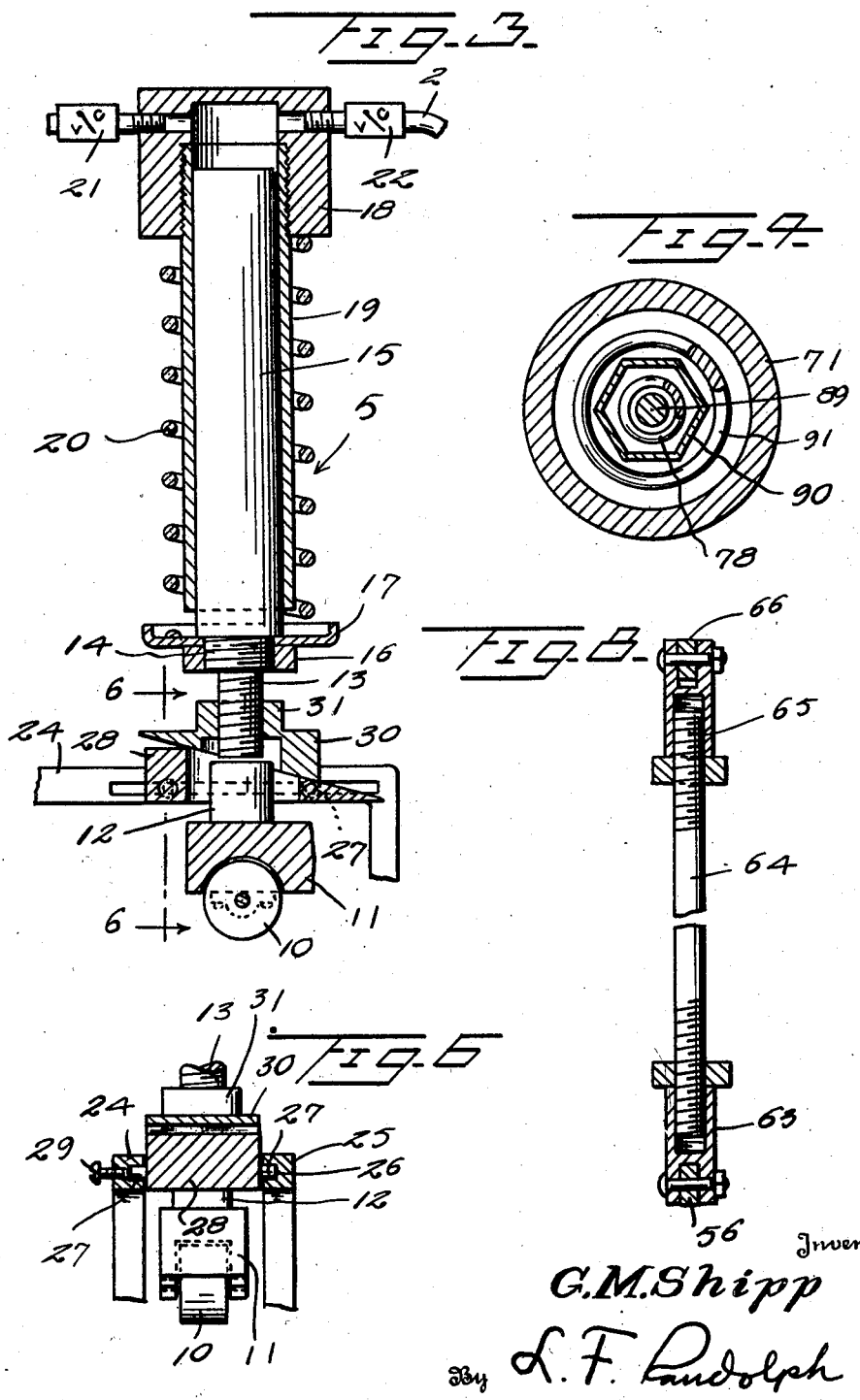

Patented Feb. 17, 1948

2,436,079

UNITED STATES PATENT OFFICE 2,436,079

SYSTEM AND APPARATUS FOR FUEL IGNITION

Guy M. Shipp, Navy Yard, S. C.

Application August 30, 1944, Serial No. 551,959

2 Claims. (Cl. 123—32)

This invention relates to a new and useful improvement in a system and an apparatus for the more efficient injection of fuel into internal combustion engines, of the type in which a predetermined liquid pressure is maintained and into which fuel is distributed and injected into the cylinders by suitable mechanically operated and timed needle valves.

Heretofore various complex and frequently impractical mechanisms have been offered for use on this type of internal combustion engine for controlling various factors such as the amount of the fuel injected, the time of injection and the pressure of the fuel injected.

The principal object of the present invention is to provide a system and apparatus whereby each cylinder on an engine develops the same horsepower as the others thereby eliminating the possibility of any one cylinder being overloaded or overworked and as a result overheating and perhaps becoming damaged.

The principal object of the present invention is to provide a system for the injection of fuel to the cylinders of an internal combustion engine which delivers fuel in direct proportion to the temperature of the individual cylinders.

Another important object of the invention is to provide an apparatus for the injection of fuel into internal combustion engine which utilizes the temperature of the individual cylinders as the controlling factor in regulating the amount of fuel to be injected, the time of injection and the pressure under which the fuel is injected.

Another important object of the invention is to provide a fuel injecting apparatus of the character stated which will operate with precision and be substantially fool proof in all respects.

Various other important objects and advantages of the invention shall become apparent to the reader of the following description.

In the drawings:

Figure 1 is a vertical sectional view showing most of the parts of the apparatus in side elevation;

Figure 2 is a fragmentary enlarged vertical sectional view through the injector and pressure box;

Figure 3 is a fragmentary vertical sectional view through the pump;

Figure 4 is a cross-section taken on line 4—4 of Figure 2;

Figure 5 is a section taken on line 5—5 of Figure 2;

Figure 6 is a fragmentary vertical sectional view taken on line 6—6 of Figure 3;

Figure 7 is a cross-sectional view taken on line 7—7 of Figure 2;

Figure 8 is a fragmentary vertical sectional view through the connecting rod between the pressure box and the injector.

Referring to the drawings wherein like numerals designate like parts it can be seen that numeral 5 generally refers to a conventional engine of a type utilizing liquid fuel injection.

In carrying out the present invention there is employed a fuel pump generally referred to by numeral 5, a pressure box generally referred to by numeral 6 and an injector generally referred to by numeral 7. These factors are all mounted upon the engine and of the assembly shown in Figure 1 with a view to regulate the amount of fuel injected, the time of injection and the pressure behind the injection for one cylinder.

The pump 5 is operated by a cam shaft 8 (Figure 1) having risers 9 thereon, which act against a roller 10 mounted within a socket in a control arm 11, this arm 11 having a foot 12 resting thereon. The foot 12 is on the lower portion of a threaded member 13 which depends from the lower threaded portion 14 of a plunger 15, which plunger is a part of the fuel pump 5. On the threaded portion 14 of the plunger 15 is a nut 16 for holding a cup 17 in place and interposed between this cup 17 and a head 18 at the upper end of a cylinder 19 for the piston 15, is a coiled compression spring 20. At the head 18 is a fuel inlet check valve 21 and a fuel outlet check valve 22, a tube 23 extending from this valve 22 to the injector as shown in Figure 1.

Underlying the pump 5 are parallelled brackets 24, 25, channelled as at 26 to receive tongues 27 on a lower wedge member 28 and set screws 29 may be employed for holding this wedge member 28 in a definite adjusted position. A cooperating wedge member 30 is located upon the wedge member 28 and is carried by a nut 31 adjustable on the threaded member 13 of the plunger 15. Obviously the stroke of the pump is regulated by these wedge members 28, 30.

The arm 11 is carried by a ring 32 on the periphery of a cam 33 which is secured to a shaft 34, this shaft being supported by bearings 35. (See Figure 1.) Also located on the shaft 34 is a cam 36 on which is a ring 37 and from this ring 37 projects an arm 38 operable by the mechanism of the pressure box 6.

The pressure box 6 consists of a drum 39 which depends into the head of the engine the bottom of this drum 39 having an upstanding guide 40 in which the lower end of a slide 41 operates.

Heat responsive fluid is placed in the drum 39 through a duct 42 and branch ducts 43 in the slide 41, the slide having a filler cap or plug 44 at its upper end.

On the intermediate portion of the slide 41 is provided with threads to accommodate the jam nuts 45, 46 embracing the central portion of a diaphragm 47.

The box 6 has an annular wall 48 which rises from the drum 39 and has an inturned flange 49 between which and a ring 50, the peripheral portion of the diaphragm 47 is clamped. Bolts 51, are employed for clamping these parts together, the bolts 51 also passing through a stop plate 52 for the diaphragm 47, through an outstanding flange 53 on an upstanding hub 54 and through a top ring 55, as is shown in Figure 2, the upper portion of slide 41 is operative through an opening in top of the hood 54.

The hood 54 has vertical slots 56, 57 therein for accommodating the arm 11 and a rocker-58, the later being fulcrumed as at 59. The inner end of the rocker 58 has a yoke 60 resting upon the nut 61 on the slide 41 and upon the yoke 60 rests a yoke 62 at the adjacent end of the arm 11.

The other end of the rocker 58 connects to a pivotal member 63 which receives the lower threaded end portion of a connecting rod 64. The upper end of the rod 64 being threaded into a pivotal member 65 on one end of a rocker 66, the rocker 66 being rockable on a fulcrum 67. One end of the rocker 66 has a foot member 68 engaged under a hook 69 at the upper end of a post 70 which is secured to an upstanding barrel 71 which forms part of the injector 7.

A plug 72 is threadedly disposed into the upper end of the barrel 71 and this plug 72 has a recess 73 therein containing a slide body 74 upon which the fulcrum 67 is located. A small opening 75 is located in the bottom of the plug 72 and through this projects a pin 76 from a follower 77 resting upon the upper end of an automatic regulating spring 78 which at its lower end impinges against the upper end of a post 79 rising from a pressure block 80, this block 80 having a boss 81 opposed to a needle injection valve 82, which extends downwardly to the lower end of an injection nozzle tip 83.

The lower portion of the barrel 71 has a duct 84 extending downwardly to an annular passageway 85 located between a threaded block below the block 80 and the threaded gear head 87 of the tip 83. This passageway for the fuel is continued down to the tip 83. As can be seen in Figure 7, the post 79 rising from the block 80 is of polygonal shape and rising from this is a stem 89, extending through the compression spring 78. Extending from far down on the post 79 is a shell of like-cross-sectional shape and denoted by numeral 90, this shell extending upwardly to the plug 72.

Outside of the shell 90 and interposed between plug 72 and the pressure block 80 is a heavier coiled compression spring 91, this spring serving as a pressure spring for the pressure block 80.

As is clearly shown in Figure 2, the fuel tube 23 extends to the duct 84 of the injector 7 and at this connection is a valve 92 for the automatic relief of excessive pressure.

In the operation of the apparatus it can be seen that the diaphragm 47 in the pressure box 6 is on a position comparative to the pressure of the fluent material within the drum 39, this pressure being proportionate to the heat of the particular cylinder of the engine. This raising and lowering of the temperature of the cylinder actuates the two arms 11, 58. (See Figure 2.) In other words, the position of these arms (and they may be continually changing) affects the operation of the pump 5 and that of the injector 7. Operation of the pump is affected through the cams 36, 33 and the arm 11. At pressure within the drum 39, the diaphragm 47 will rise, lifting the arm 11 and rotating the cam 36 which effects the movement of the shaft 34, although minutely, resulting in a slight actuation of the cam 33 with the result that arm 11 is slightly moved and the roller carrying end thereof is shifted horizontally to a slightly different position under the plunger foot 12 of the pump 11 with the result that the timing between the roller and the cam riser 9 is changed. This takes care of the timing of the pump action.

Obviously the stroke of the plunger 15 can be regulated by shifting and setting of the wedge member 28.

Simultaneously with the actuation of the arm 11, the arm 58 is operated and in turn the connecting rod 64 and rocker 68 are moved to effect one way or the other the automatic pressure regulating spring 78. In this manner the pressure at which the fuel is injected is regulated in response to the temperature within the cylinder through the medium of the pressure box 6.

While the foregoing specification sets forth the invention in specific terms, it is to be understood that numerous changes in the shape, size and materials may be resorted to without departing from the spirit and scope of the invention as claimed hereinafter.

Having described the invention what is claimed as new is:

1. In combination with an internal combustion engine a fuel pump and an injector, said pump and injector being connected in operative relation, a cylinder heat responsive unit for adjusting the output of said pump and injector, said unit comprising a drum containing a heat expansible liquid, a diaphragm operated by the expansion of the liquid and mechanical elements responding to the action of the diaphragm being in connection with said pump and injector, a stem operated by the diaphragm, said mechanical elements including a pair of arms each provided with a yoke embracing the stem, said stem being provided with a filler head, said stem having a duct extending from the filler head to open through a side thereof within the drum.

2. In combination with an internal combustion engine a fuel pump and an injector, said pump and injector being connected in operative relation, a cylinder heat responsive unit for regulating the action of said pump and injector, said unit comprising a drum containing a heat expansible liquid, a diaphragm operated by the expansion of the liquid and mechanical elements responding to the action of the diaphragm being in connection with said pump and injector including a pair of arms each provided with a yoke embracing the stem, said stem being provided with a filler head, said stem having a duct extending from the filler head to open through a side thereof within the drum, a hood having slot therein through which the arms operate.

GUY M. SHIPP.

REFERENCES CITED

The following references are of record in the file of this patent:

UNITED STATES PATENTS

| Number | Name | Date |
|---|---|---|
| 1,487,539 | Clementz | Mar. 18, 1924 |
| 1,860,862 | Le Pul | May 31, 1932 |
| 1,890,225 | Lorimer | Dec. 6, 1932 |
| 2,073,164 | Meyer | Mar. 9, 1937 |
| 2,016,619 | Walker | Oct. 8, 1935 |
| 2,297,231 | Lichte | Sept. 29, 1942 |
| 2,413,111 | Malin | Dec. 24, 1946 |
| 2,126,709 | Alden | Aug. 16, 1938 |
| 2,398,460 | Ricart | Apr. 16, 1946 |
| 2,414,617 | Summers | Jan. 21, 1947 |